2,990,327
COMPOSITION AND METHOD FOR TREATING BILIARY DYSKINESIA

Alfred Halpern, Great Neck, N.Y., assignor to Synergistics, Inc., New York, N.Y., a corporation of New York
No Drawing. Filed July 14, 1960, Ser. No. 42,770
5 Claims. (Cl. 167—65)

The present invention is related to a therapeutic preparation intended for use in the treatment of cholecystopathic conditions. More specifically this invention describes the use of a pharmaceutical preparation, effective in the treatment of choledyskinesia, i.e. functional disturbances related to irregularities in the motility of the gall bladder. A further object of this invention is to describe a method for the preparation of this pharmaceutical composition.

The diseases of the gall bladder may be divided into (1) inflammatory, (2) lithiatic and (3) acute, chronic, bilious discomforts not referable to any obvious organic disease or pathological condition. The first group includes infections which may be due to penetration of bacteria from other organs, anatomically close to the gall bladder, mainly the intestine, the liver, or they may be the result of the acute chronic diseases shown in (3). The second group includes the biliary calculi, which are usually associated with gastric and pancreatic disturbances, as well as liver disturbances.

The third group of diseases is related to irregular abnormal motility of the gall bladder. These diseases constitute an example of one of the least known branches of internal medicine. Many cases apparently have received erroneous diagnoses, e.g. as duodenal ulcer cases or chronic appendicopathy cases; patients have complained of "liver" disturbances, when actually their hepatic function was normal.

The failure to recognize cases of choledyskinesia has undoubtedly been due to the lack of typical symptoms for the diseases. For instance, patients afflicted with the hypertonic type of choledyskinesia complain of great pain, mainly at night, when vagal stimulation increases, intestinal disorders, constipation or diarrhea. None of these symptoms is distinctive.

The symptomatology of the atonic type of choledyskinesia is somewhat more helpful: here the patient complains of uncomfortable feelings particularly after breakfast, vertigo, migraine; green-black feces appear which are probably due to a sudden emptying of the gall bladder, and which are excreted after repeated constipation. Many substances have been suggested to counteract the gall bladder sluggishness and to restore the normal motility. Of the known cholecystokinetics, the most active are magnesium sulfate, olive oil, egg yolk, fresh cream. The continuous use of olive oil, however, especially after breakfast, is nauseating to many people; eggs and cream are objectionable if liver disorders are also present.

Many plant extracts have been tentatively used for their cholecystokinetic action. A few examples are extracts of eggplant, the African plant *Combrethum micranthum*, black-radish, and artichoke. Unfortunately these natural extracts are not selective, because other constituents in addition to the active component are present. For instance, the actual role of the artichoke extract is choleretic rather than cholagogic or cholecystokinetic, that is, it increases hepatobiliary secretion rather than acting on the gall bladder. This choleretic activity is undesirable because it places an overload on the liver; a cholagogic formulation, that is, a medicine able to increase the flow of bile into the intestines and to evacuate the gall bladder, should not increase the flow of bile from the liver.

The present invention is based on the discovery that a mixture of D-sorbitol and homatropine methyl bromide, the ingredients acting synergistically, is singularly effective in treating cases of biliary dyskinesia not referable to obvious organic disease or pathological condition.

Chemically, sorbitol is releated to glucose, by reduction of the terminal aldehydic function to a primary alcoholic group. In spite of the chemical relationship, it differs radically from glucose in its physiological activity. Sorbitol does not penetrate cell tissues, it is not utilized by the extrahepatic cells and it has been suggested as a sugar substitute in diabetes.

The lack of toxicity of sorbitol is obvious from the fact that it aids absorption of vitamins of the B group and it is found as the active constituent in therapeutic preparations used as general tonics.

The sorbitol used in the therapeutic composition described herein is a synthetic product, obtained by catalytic hydrogenation of glucose and the purity of the material used accounts for its selectivity and substantial lack of choleretic activity.

The oral administration of soribitol to patients afflicted with gall gladder sluggishness, if followed by rapid relief (i.e. evacuation of the gall bladder into the intestine), is smoothly accompanied by distention of the Oddi's sphincter and dilation of the common bile duct.

There are cases, however, of acute biliary deficiency which cannot be adequately related to just one factor, the insufficient motility of the gall bladder. Further study of these cases and an examination of the anatomy and physiology of the gall bladder reveal that a more satisfactory control of the autonomic nervous system is required in order to attain satisfactory therapy. For instance, it is obvious that in acute cases where the sphincter of Oddi remains closed, the administration of sorbitol alone is not effective, or it may even lead to greater pain, because evacuation of the gall bladder would not accompany its contractions. Dual simultaneous therapy, therefore, is required in cases where the Oddi's sphincter does not function properly.

In order to allow the sorbitol to exert its full therapeutic effect, an additional agent is needed which favors coordination of the gall bladder contraction with the relaxation mechanism of Oddi's sphincter. The function of Oddi's sphincter as the opening which allows the bile to flow into the intestine is emphasized here as the most obvious mechanism in the gall bladder evacuation; however, it should be kept in mind that this complex phenomenon is not exclusively controlled by the Oddi's sphincter but other muscle fibers are present at the neck of the gall bladder which exercise a sphincteric or regulatory action on the flow of bile.

Since the sphincter of Oddi is under the influence of sympathetic and vagal nerves, the interruption of these stimuli by parasympathicolytic or anticholinergic action should be beneficial in relieving cases of choledyskinesia, by coordinating relaxation of duct and sphincter with the action of sorbitol. Homatropine methyl bromide exerts the desired synergistic effect with sorbitol.

Homatropine methyl bromide is a quaternary salt in which the basic moiety is the ester tropine with mandelic acid, that is mandelyltropeine. The basic moiety, therefore, is analogous to atropine, except for the substitution of tropic acid with mandelic acid.

Homatropine methyl bromide is usually administered to relieve spasm of the gastrointestinal tract.

Although the combination of sorbitol and homatropine methyl bromide is beneficial in general in stimulating contractions of the gall bladder, its use is particularly recommended in the atonic type of the disease.

The results have been surprisingly effective in restoring proper biliary function, and normalization of gall bladder evacuation.

The indirect results have also been significant, i.e. those disturbances which are usually associated with choledyskinesia, mainly improper digestion, constipation, "sick headache," have disappeared or have greatly diminished.

Although the combination of sorbitol and homatropine methyl bromide has no direct action on the liver, the ultimate result is to relieve patients from liver disturbances, which would normally occur as a result of biliary stasis. The patients show greater tolerance to fatty foods, they are relieved from abdominal distress, from dyspeptic symptoms ordinarily accompanying cholecystopathy and hepatobiliary diseases. These dyspeptic symptoms are bloating, heaviness after meals and formation of gas. Relief from choledyskinesia also results in relief from parietal inflammation, which ultimately may prove conducive to lithogenesis.

Applicant has found that the combination of homatropine methyl bromide and sorbital asserts a synergistic effect so that the therapeutic result in the treatment of the above-mentioned biliary disorders is greater than when either is used separately. Furthermore, it has been found that if a ratio of from 3 to 6 gm. of sorbitol are administered together with .05 to 1.5 mgm. of homatropine methyl bromide, an optimal therapeutic effect will be achieved, although it should be recognized that individual patients will require either more or less of the drug, depending on the particular status of their disease, although the ratio of sorbitol to homatropine methyl bromide is maintained within the limits described.

This synergistic therapeutic effect has been demonstrated by a study which indicated that 92.2% of 65 "hard core" cases, all of whom had failed to respond earlier to therapeutic regimens, were symptomatically benefited to a significant degree by the combination of sorbitol and homatropine methyl bromide in the ratio here described.

In another study it was shown that this combination of substances administered in the ratio described is physiologically more acceptable as a cholagogue than other preparations and is especially indicated for use in gall bladder conditions not suitable for surgical intervention, and especially prevents and relieves retention of bile in the biliary system.

It is important to note that this combination of active ingredients, within the limits described, is safe and well tolerated. It is singularly free from side reactions which are known to occur with other members of this component class such as atropine and other cholinergic drugs and may be administered to patients of all ages in all degrees of health.

The synergistic combination of sorbitol and homatropine methyl bromide as defined herein has been proved to be particularly effective in biliary digestive malfunctions associated with the latter half of the pregnancy term. 27 of 30 patients treated with the product of the invention showed moderate to marked improvement, while three were not improved. On increasing the dosage, ten patients who had reported either no or moderate improvement were benefited by the increased dosage. When this daily dosage was prescribed, the ratio of the active ingredients which applicant found to be optimal was maintained. In contrast to this, of a group of 26 patients treated with placebo medication, only 7 reported improvement while the other 19 reported no improvement.

The following examples illustrate the scope of the invention.

Example 1

To 200 ml. of simple syrup, U.S.P., is added 450 gm. of D-sorbitol and the mixture heated on a water bath until complete solution results. The mixture is cooled to room temperature and 100 mgm. of homatropine methyl bromide are dissolved therein. The volume of the solution is then brought up to exactly 500 ml. Filtering is generally not necessary to clarify this solution and a stable homogeneous clear solution suitable for oral administration results.

To utilize this solution for therapeutic purposes, it may be prescribed in dosage of 5 ml. (one teaspoonful) three times daily. It is preferred that the medication be administered approximately one-half hour before meals.

While the preferred concentration of D-sorbitol and homatropine methyl bromide in each dose is the ratio of 4.5 gm. and 1.0 mgm., respectively, the range of dosage producing this desirable effect may be as high as 6 gm. and 1.5 mgm., respectively, and as low as 3 gm. and .05 mgm., respectively.

Utilizing this particular range in the ratio of active ingredients, the exact particular patient requirements may be modified to suit the specific needs.

Example 2

In place of the syrup used as a vehicle in Example 1, there may be substituted wholly or in part a hydroalcoholic solution containing up to 40% ethanol, glycerine, in concentrations up to 10%, propylene glycol, in concentrations up to 50%, ethanol and distilled water. Flavoring, aromatics and coloring may be added as desired.

Example 3

When it is desired to administer this product in a solid dosage form, tablets or capsules may be prepared. Because of the hygroscopic nature of the D-sorbitol, a filler such as magnesium stearate may be added in concentrations of from 10 to 25 percent of the weight of the final tablet or capsule. The weight of active ingredients, i.e. D-sorbitol and homatropine methyl bromide in each unit must be within the range of from not more than 6 gm. of D-sorbitol to 1.5 mgm. of homatropine methyl bromide, and not less than 3 gm. of D-sorbitol to 0.5 homatropine methyl bromide, with an optimal ratio of 4.5 to 1. The range of dosage of the tablets or capsules will vary with the individual patient needs and may be utilized three to six times daily because of the inherent safety of this synergistic mixture.

Example 4

The combination of D-sorbitol and homatropine methyl bromide may be dispensed as a solid powder doseform for oral administration. This powder may be packaged in individual dose units or bulk-packed for teaspoon and/or tablespoon administration. In order to prepare such a powder the following procedure is observed:

45 gm. of D-sorbitol is mixed with 1 gm. of polyoxyethylene glycol, having an average molecular weight of 6,000 (which is known commercially as Carbowax-6,000 and is manufactured by Union Carbon and Carbide Chemicals Co., N.Y.). To this is added a granulation of homatropine-methylbromide, 10 mgm.; lactose, 2 gm. and starch (water soluble), 1.5 gm. The entire powder mixture is granulated through a Fitzpatrick granulating machine (or other suitable granulating device) utilizing a twenty-mesh screen. The particle size is then further reduced to a 60-mesh size, to afford a uniform homogeneous powder preparation. This preparation may then be subdivided into ten individual units so that each contains D-sorbitol and homatropine methyl bromide in the ratio of 4.5 gm. to 1 mgm. respectively, and lactose 200 mgm., starch 150 mgm. and Carbowax-6,000 100 mgm. as filler, diluent and preservative. Flavoring and coloring may be added as desired. The individual units may be packaged in metallic foil units or heat-sealed paper packets to afford a convenient method of administration.

The dosage requirements will vary with the individual patient's needs, although a dosage regimen of one packet or unit three times daily, taken one half hour before meals will be found to be satisfactory for the majority of the patients.

When packaged as a bulk powder, a heaping teaspoonful three times a day will provide therapeutic quantities to cause the desired beneficial effects.

The present application is a continuation in part of applicant's copending patent application Serial No. 735,363, filed May 15, 1958, now abandoned.

It is not desired to be limited except as set forth in the following claims, the above description being by way of illustration of the invention.

What is claimed is:

1. The method of treating biliary dyskinesia which consists of orally administering D-sorbitol and homatropine methyl bromide in the ratio of not more than 6 gm. to 1.5 mgm., respectively, and not less than 3 gm. to 0.5 mgm., respectively.

2. The method of claim 1 in which each unit dosage includes at least 3 gm. of D-sorbitol.

3. A therapeutically active anti-choledyskinetic preparation comprising D-sorbitol and homatropine methyl bromide in the ratio of not more than 6 gm. to 1.5 mgm., respectively, and not less than 3 gm. to 0.5 mgm., respectively.

4. The preparation of claim 3 in which each unit dosage includes at least 3 gm. of D-sorbitol.

5. An oral therapeutic composition for the treatment of biliary dyskinesia comprising in unit dosage form from about 3 gm. to 6 gm. of D-sorbitol and from 0.5 to 1.5 mgm. of homatropine methyl bromide and a pharmaceutical diluent.

References Cited in the file of this patent

UNITED STATES PATENTS

| | | |
|---|---|---|
| 2,836,541 | Lager | May 27, 1958 |
| 2,854,380 | Jensen et al. | Sept. 27, 1958 |

FOREIGN PATENTS

| | | |
|---|---|---|
| 668,850 | Great Britain | Mar. 26, 1950 |
| 744,223 | Great Britain | Feb. 1, 1956 |

OTHER REFERENCES

Sollmann: "Manual of Pharmacology," 7th ed., Saunders, Philadelphia, 1948, pp. 311–314.

United States Dispensatory, 25th ed., 1955, p. 1867, entry "Sorbus"; also pp. 1302, 1303.